March 9, 1943.  C. V. JOHNSON  2,313,242
SHOCK STRUT
Filed Oct. 30, 1940
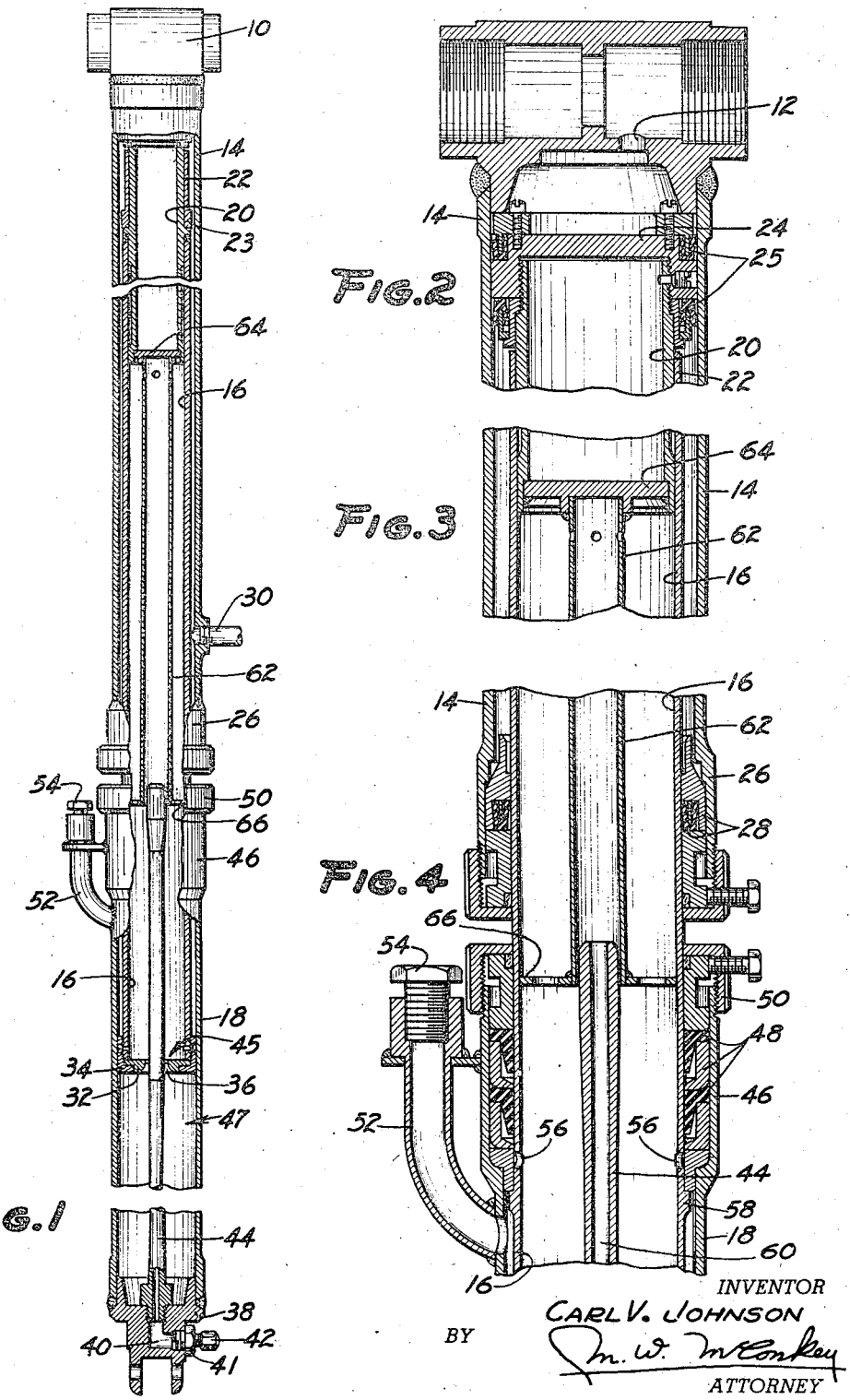
INVENTOR
CARL V. JOHNSON
BY
M. W. McConkey
ATTORNEY Patented Mar. 9, 1943

2,313,242

UNITED STATES PATENT OFFICE 2,313,242

SHOCK STRUT

Carl V. Johnson, South Bend, Ind., assignor to Bendix Aviation Corporation, South Bend, Ind., a corporation of Delaware Application October 30, 1940, Serial No. 363,468

11 Claims. (Cl. 267—64)

My invention relates to shock struts, and more particularly to a shock strut of long stroke. The invention is shown and described as embodied in a shock strut having an integral hydraulic jack for retracting the strut.

A shock strut applied to an airplane is subject to the vibration of the plane, and must be designed to withstand severe vibration. When an aircraft lands, wheel shimmy sometimes develops, and the strut must be designed to withstand this vibration also.

A type of shock strut commonly used on aircraft is the oleo type wherein oil is metered through an orifice controlled by a metering pin. Metering pins may be of several types, but the most common type is the pin which is attached to a member which has relative movement with relation to the metering orifice. When the stroke of the shock strut is long, the metering pin is more susceptible to severe vibration due to the long overhang as it can be secured only at one point. The vibration of the metering pin causes fatigue, and if vibration were not prevented, the pin might break off and prevent the shock strut from functioning. Such a situation might result in disaster for the aircraft, and this possibility must be eliminated.

My invention therefore comprises means to reduce or prevent vibration in a shock strut metering pin. My invention also comprises the features and novelties of construction made necessary to apply my discovery to a shock strut having an integral hydraulic jack.

It is therefore an object of my invention to provide means in a shock strut to reduce or prevent vibration in a metering pin.

A further object is to provide means to reduce or prevent metering pin vibration, which means do not interfere with the operation of the shock strut.

Another object is to provide means in a metering pin for supplying fluid to a shock strut.

A feature of the invention is the provision of means in the side of a shock strut for supplying fluid to the strut.

Other objects and features of the invention will be apparent in the following description and claims which may best be understood when considered in connection with the accompanying drawing, in which:

Figure 1 is a view in elevation of a shock strut in section, the strut having an integral hydraulic retracting jack;

Figure 2 is a detail view in enlarged section of the retracting piston of the shock strut in Figure 1;

Figure 3 is an enlarged detail view of the part of Figure 1 showing the construction of the upper end of a metering pin guide; and Figure 4 is an enlarged view in section of the central part of the shock strut of Figure 1.

The shock strut shown in Figure 1 is of the type incorporating a hydraulic jack. The upper part of the mechanism shown is the hydraulic jack unit, and the lower part is the oleo shock absorber unit. The hydraulic jack unit is shown in its compressed state, and the oleo shock absorber unit is shown in its extended state.

I will first describe the hydraulic jack portion of the device. The shock strut is fastened to the aircraft in which it is placed by a combined fitting and base plate 10. A hole 12 (Figure 2) in this piece allows hydraulic fluid to flow from a source connected to the base plate 10 to the interior of the strut. A metal cylinder 14 is welded to the base plate 10, and constitutes the part of the strut which is rigidly secured to the aircraft. A long tube 16 telescopes within cylinder 14. This tube 16 is urged outwardly in cylinder 14 by the hydraulic jack fluid when it is desired to extend the shock strut unit as in preparation for landing. The lower end of tube 16 (Figure 1) is surrounded by an outer cylinder 18, which telescopes on tube 16 to create the shock absorbing function of the shock strut. A landing wheel of the aircraft is attached to the lower end of the cylinder 18.

The upper end of the tube 16 carries and has welded thereto a liner 20, as shown in Figure 1, to strengthen the tube 16. A sleeve 22 is placed over the protruding end of liner 20 and has an enlarged section 23 to limit the outward extension of the strut by the hydraulic jack. A two part piston head 24 (see Figure 2) carrying rubber sealing rings 25, is screwed to the upper end of liner 20 and retains sleeve 22 on liner 20. Hydraulic fluid acting on the top of piston 24 tends to extend the hydraulic jack and hydraulic fluid acting on the bottom annulus of piston 24 tends to retract the hydraulic jack.

The lower end of cylinder 14 (Figure 4) is enlarged as at 26 to retain a packing gland 28. This packing gland 28 contacts the enlarged section 23 of the sleeve 22 to limit the outward extension of tube 16 by the hydraulic jack. The cylinder 14 also contains a tube connection 30 through which hydraulic fluid flows upon operation of the hydraulic jack. Fluid is forced into this connection 30 to fill the chamber between tube 16 and cylinder 14 to contract the hydraulic jack portion of the strut, and fluid leaves this tube during the extending operation of the jack, at the same time that hydraulic fluid enters hole 12 to act on piston head 24.

The shock absorbing unit of the strut comprises a piston 45 operating in a closed cylinder 47, the piston head containing a metering orifice 36. The piston 45 is formed by securing a plate 32 to the lower end of tube 16 by means of an annular nut 34 threaded to tube 16. The plate or piston head 32 contains a central metering orifice 36 through which fluid is metered in absorbing the shock of landing of the aircraft. The closed cylinder 47 in which the piston tube 16 operates is formed by welding a closure plate 38 to the bottom of tube 18. Closure plate 33 contains an angular passage 40, sealed by a check valve fitting 41 and a plug 42 on the outside. The plate is threaded at its inner end to receive a metering pin 44.

The upper end cylinder 18 is enlarged as at 46 as shown in Figure 4. The enlargement 46 receives a packing unit 48 held in the enlargement by an annular nut 50 threaded to the enlargement 46. The upper end of cylinder 18 also retains a filler tube 52, which connects to cylinder 18 just below the enlargement 46. The filler tube contains a cap 54 to seal it. Hydraulic fluid for the shock absorbing unit is poured in the hole and flows into the cylinder 18. When the holes 56 in tube 16 communicate with tube 52, which happens when cylinder 18 is telescoped on tube 16, hydraulic fluid may flow into the inside of tube 16, from cylinder 18.

Tube 16 also has an external annular enlargement 58 which acts as a stop for the extension of cylinder 18 when the enlargement contacts the packing unit 48.

The metering pin 44 is hollow, having a passage 60 through its length. The metering pin varies in cross-section to change the effective cross-sectional area of the metering orifice 36 depending upon the desired characteristics of the shock absorbing stroke. The metering pin 44 extends longitudinally in the strut and passes through the metering orifice 36 and has its upper end guided in a tube 62, which is just slightly larger in inside diameter than the outside diameter of the metering pin, thereby preventing any substantial vibration of the metering pin 44. The guide tube 62 is held at its upper end by a plate 64 shown in Figure 3 secured at the lower end of liner 20 to cose said lower end. The lower end of guide tube 62 is held by a perforated plate 66 fitted within tube 16 as shown in Figure 4.

To prepare the strut for operation, assuming that the strut is in the condition shown in Figure 1, the strut must first be extended by the hydraulic jack. This operation is performed by forcing fluid under pressure through hole 12 in the base plate 10. This fluid acts on the piston head 24 to force tube 16 outwardly from within cylinder 14 until the projection 23 on sleeve 22 strikes the packing 28 in the enlargement 26 on the lower end of cylinder 14.

The extension of the strut by the hydraulic jack positions tube 16 to allow the telescoping of the shock absorbing unit. Next by manual operation, cylinder 18 is telescoped on tube 16, which allows the holes 56 to communicate with filler tube 52. Check valve fitting 41 is then removed to allow the escape of air from the shock absorbing unit. Hydraulic fluid is next poured into the strut through filler tube 52, and this fluid flows into the annular space between 18 and 16 and through holes 56 into the chamber of tube 16. When the liquid level in the compressed shock absorbing unit reaches the top of filler tube 52, the cap 54 is screwed tightly in place. The shock absorbing unit is then allowed to extend, and the hydraulic fluid flows from the chamber of cylinder 16 through the metering orifice 36 to the chamber of cylinder 18, as this chamber develops when cylinder 18 is moved outwardly on tube 16. In the extended position of the shock absorbing unit, hydraulic fluid fills the cylinder 18 and covers the metering partition 32 a slight amount.

The shock absorbing unit is next filled with a compressed gas (as for example compressed air) to give it a resilient shock absorbing medium for taxiing of the aircraft. This is accomplished by screwing check valve fitting 41 in place and removing plug 42 and applying high pressure gas. The gas flows through passage 40 and through the hollow metering pin 44 to the upper part of tube 16. The check valve fitting 41 in passage 40 retains this high pressure gas and plug 42 is screwed in place for additional safety in retaining the high pressure gas. In the final extended position the shock absorbing unit is thus filled with a hydraulic fluid to a point just above the partition 32 and the rest of the unit is filled with a gaseous fluid under pressure.

The purposes in having two means, filler tube 52 and metering pin 44, for supplying fluid to the shock absorbing unit are several. It is desirable from a maintenance standpoint to be able to withdraw air from a shock strut without withdrawing hydraulic fluid at the same time. If filler tube 52 were the only entrance to the unit it would be necessary to discharge oil in order to discharge air. Also, the filler tube 52 provides an easy means for keeping the hydraulic fluid at a correct level, when the air passage through the metering pin 44 is open.

When the aircraft is in flight the hydraulic jack retains the shock strut unit in a withdrawn position as shown in Figure 1. This is done by applying hydraulic fluid through connection 30 to the space between cylinder 14 and tube 16. The fluid acts on the sealing rings 25 of the piston head 24 to force tube 16 upward in the strut as is shown in the drawings. The hydraulic fluid on top of piston 24 escapes through hole 12. The compressed gas in the shock absorbing unit causes that unit to be extended as also shown in Figure 1.

Before landing the aircraft, the hydraulic jack is actuated to force tube 16 outwardly. This is done by passing hydraulic fluid through hole 12 where it acts on piston head 24. Exhaust fluid flows out through connection 30. The tube 16 is extended until the enlargement 23 strikes the packing 28 in tube 14. Thereafter, upon contact of the wheels with the ground, the weight of the aircraft is borne by the strut, subjecting the hydraulic fluid in cylinder 18 to additional pressure. The hydraulic fluid flows through orifice 36 in partition 32, and the kinetic energy of landing is converted into heat, thereby gradually absorbing the shock of landing. As the hydraulic fluid is metered through orifice 36, the gas in tube 16 becomes more compressed, until it supports the weight of the aircraft. The gas gives a resilient shock absorbing medium of taxiing, after the landing shock has been absorbed by the hydraulic fluid.

At all times the guide tube 62 keeps the top of long metering pin 44 from vibrating with any appreciable amplitude and thereby insures that it will not be injured. The guiding means could be of any other suitable nature, and still be within my invention. My invention is not limited to the disclosure of the drawing, which is for purposes of illustration only, nor is the invention limited in any other way except by the terms of the following claims.

I claim:

1. In a shock strut having a hydraulic jack, a shock absorbing unit comprising two telescoping members, said members having a filler tube by which liquid is supplied and a hollow metering pin in association therewith by which displaced gas may escape.

2. In a shock strut having a hydraulic jack, a shock absorbing unit comprising two telescoping members, said members having a filler tube by which liquid is supplied, a hollow metering pin by which displaced gas may escape and a metering pin guide in association therewith.

3. In a shock strut, telescoping cydinders having closed outer ends, a partition on the inner end of the inner cylinder having a metering orifice, a metering pin secured to the outer cylinder and passing through the metering orifice of the partition and a guide tube secured longitudinally to the iner cylinder and adapted to surround the free end of the metering pin, said guide tube being but slightly larger inside than the end of the metering pin so as to act as a guide.

4. In a shock strut, telescoping cylinders having closed outer ends, a partition having an orifice therein between said cylinders, a metering pin secured to one of said cylinders and passing through said orifice, and a guide for the free end of said metering pin secured to the other cylinder.

5. In a shock strut, a pair of telescoping cylinders having their outer ends closed, a partition at the inner end of one of said cylinders and having a metering orifice therein, a metering pin secured to the closure of one of said cylinders and passing through said metering orifice, and means for guiding said metering pin at its unsecured end comprising a tube secured to the closure of the other cylinder.

6. In a shock strut, a pair of telescoping cylinders having their outer ends closed, a partition at the inner end of one of said cylinders having a metering orifice, a metering pin secured to the closure of the other of said cylinders and passing through said orifice, means for guiding said metering pin at its unsecured end comprising a tube secured to the first said cylinder and being but slightly larger in inside diameter than the greatest outside diameter of the metering pin.

7. In an airplane shock strut of the type which is extensible by hydraulic fluid to the working position, a hydraulic jack for extending the strut to the working position, shock absorbing means of the pneumatic-hydraulic type comprising a pair of telescoping cylinders having closed outer ends, one of said cylinders containing an incompressible fluid for taking the shock of the landing operation, the other of said cylinders containing a compressible fluid for taking the shocks caused by taxiing, a partition between said cylinders substantially separating the incompressible fluid from the compressible fluid and having a metering orifice therein for passing the incompressible fluid to the cylinder containing compressible fluid, a metering pin for said orifice secured at one end to the outer end of the cylinder containing incompressible fluid, and means for guiding the unsecured end of the metering pin secured to the outer end of the cylinder containing compressible fluid.

8. In an airplane shock strut of the type which is extensible by hydraulic fluid to the working position, a hydraulic jack for extending the strut to the working position, shock absorbing means of the pneumatic-hydraulic type comprising a pair of telescoping cylinders having closed outer ends, one of said cylinders containing an incompressible fluid for taking the shock of the landing operation, the other of said cylinders containing a compressible fluid for taking the shocks caused by taxiing, a partition between said cylinders substantially separating the incompressible fluid from the compressible fluid and having a metering orifice therein for passing the incompressible fluid to the cylinder containing compressible fluid, a metering pin for said orifice secured at one end of the cylinder containing incompressible fluid, and means for guiding the unsecured end of the metering pin and secured to the outer end of the cylinder containing compressible fluid, said means comprising a tube of inner diameter but little greater than the greatest outside diameter of the metering pin.

9. In an airplane shock strut of the type which is extensible by hydraulic fluid to the working position, a hydraulic jack for extending the strut to the working position, shock absorbing means of the pneumatic-hydraulic type comprising telescoping cylinders having closed outer ends, one of said cylinder containing an incompressible fluid for taking the shock of the landing operation, the other of said cylinders containing a compressible fluid for taking the shocks caused by taxiing, a partition on the inner end of the inner cylinder and having a metering orifice therein for passing the incompressible fluid to the cylinder containing compressible fluid, a metering pin for said orifice secured to the outer cylinder and passing through said orifice, and a guide tube for the unsecured end of said metering pin secured at the outer end of the inner cylinder, said guide tube having an inner diameter but little greater than the greatest outside diameter of the metering pin.

10. In a shock strut of the type which is extensible by hydraulic fluid to the working position, a hydraulic jack for extending the strut to the working position, shock absorbing means of the pneumatic-hydraulic type comprising telescoping cylinders having closed outer ends, the outer of said cylinders being supplied with incompresible fluid for taking the shock of the landing operation, the inner of said cylinders being supplied with compressible fluid for taking the shocks caused by taxiing, a partition on the inner end of the inner cylinder substantially separating the incompressible fluid from the compressible fluid and having a metering orifice therein for passing the incompressible fluid to the cylinder containing compressible fluid, a metering pin for said orifice secured to the outer cylinder and passing through said orifice, and a guide tube for the unsecured end of said metering pin secured at the outer end of the inner cylinder, said guide tube having an inner diameter but little greater than the greatest outside diameter of the metering pin.

11. In a shock strut of the type which is extensible by hydraulic fluid to the working position, a hydraulic jack for extending the strut to the working position, a shock absorbing unit of the pneumatic-hydraulic type comprising a pair of telescoping members having their outer ends closed, a partition in one of said telescoping members having a metering orifice therein for substantially separating the chambers formed whereby the hydraulic medium is substantially separated from the gaseous medium, a hollow metering pin secured to the outer end of one of said telescoping members and passing through said orifice, guide means for said hollow metering pin secured to the other of said telescoping members comprising a tube of inside diameter but little greater than the greatest outside diameter of said metering pin, a filler tube for the outer telescoping member whereby hydraulic fluid can be admitted to said shock absorbing unit, and means in association with said hollow metering pin and said guide whereby gaseous fluid may be displaced while hydraulic fluid is being admitted, said means also permitting of the entrance of gaseous medium under pressure after the hydraulic fluid has been admitted.

CARL V. JOHNSON.